March 10, 1953 — J. J. SEELMAN — 2,630,992
EASEL TYPE PICTURE FRAME
Filed Nov. 18, 1947 — 3 Sheets-Sheet 1

INVENTOR.
JOHN J. SEELMAN
BY
Wheeler, Wheeler & Wheeler
ATTORNEYS

March 10, 1953      J. J. SEELMAN      2,630,992
EASEL TYPE PICTURE FRAME
Filed Nov. 18, 1947      3 Sheets-Sheet 2
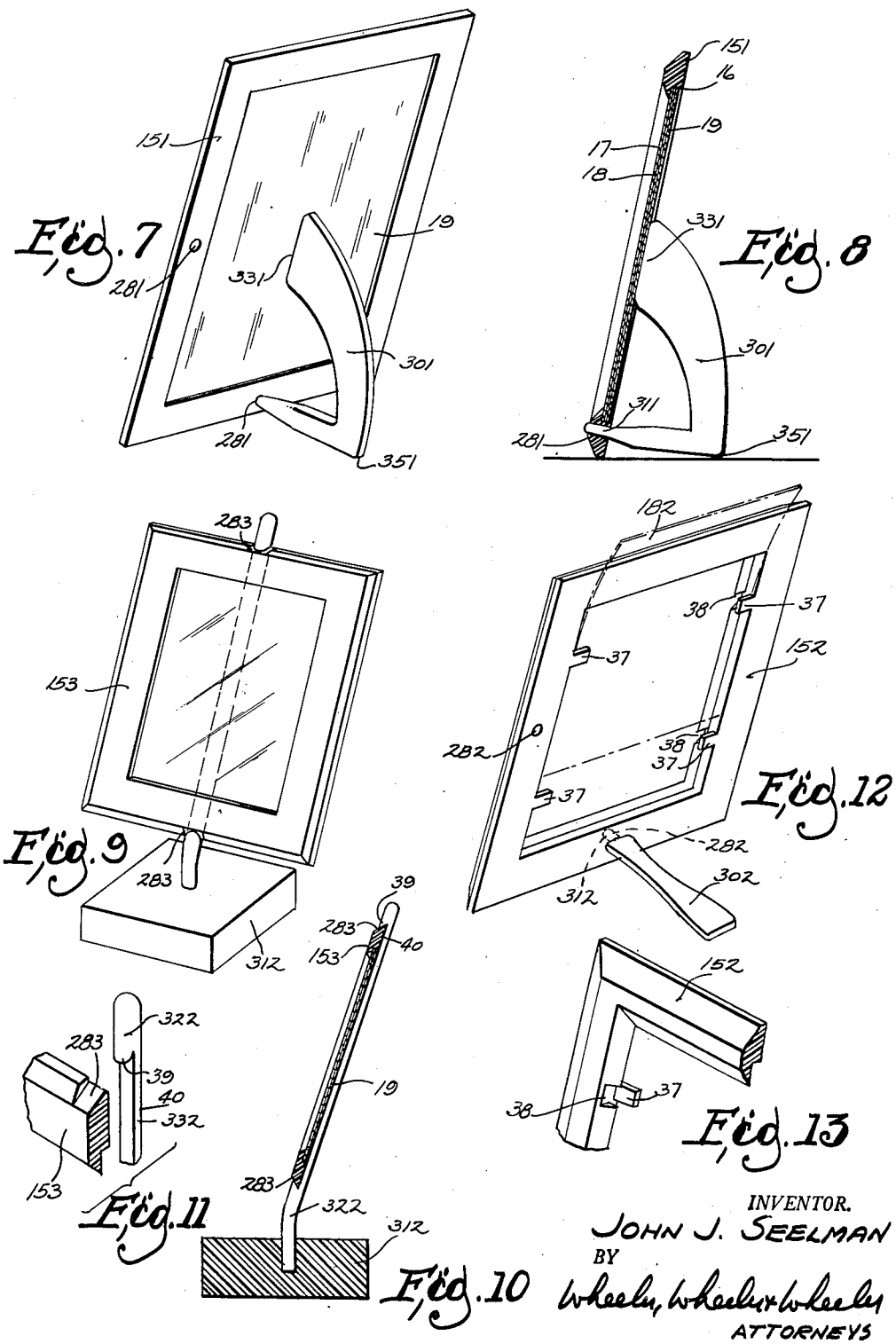
INVENTOR.
JOHN J. SEELMAN
BY
Wheeler, Wheeler & Wheeler
ATTORNEYS

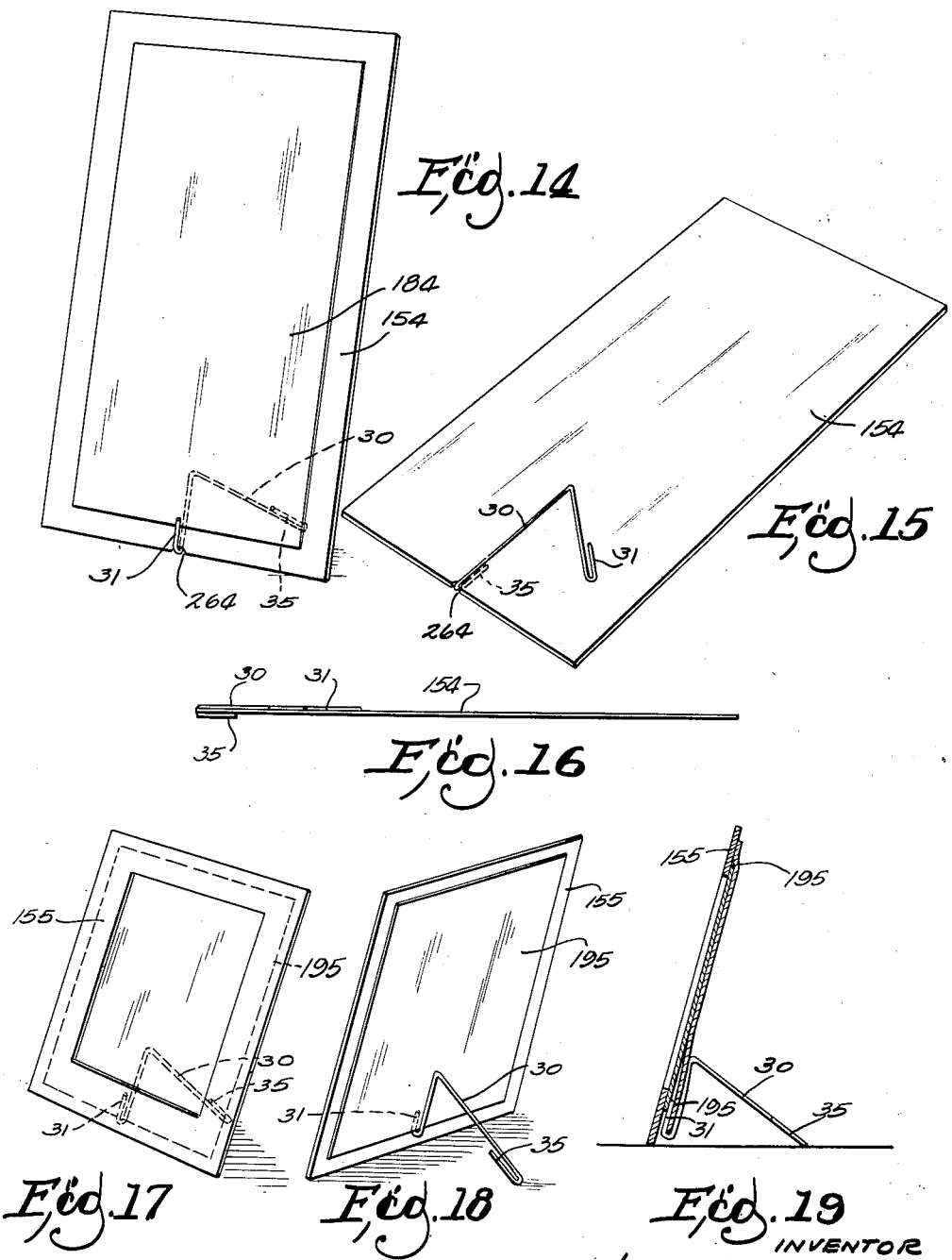

Patented Mar. 10, 1953

2,630,992

UNITED STATES PATENT OFFICE 2,630,992

EASEL TYPE PICTURE FRAME

John J. Seelman, Milwaukee, Wis.

Application November 18, 1947, Serial No. 786,577

6 Claims. (Cl. 248—28)

This invention relates to mounts and easel assembly for cards, displays, or pictures. As will appear more particularly hereinafter, the present invention is concerned with a particular type of easel and a particular relationship between the easel and the mount, the easel being applicable to a wide variety of mounts including, within the generic expression "mount," such devices as picture frames with or without backs, single sheets of glass or cardboard which may either bear a picture printed or attached thereon, or may have a picture on a separate sheet loosely applied thereto for purposes of display.

It is a primary object of the invention to provide a mount which can economically be made of plastic, leather, paper board, glass or the like and provided with an easel which is detachably connected with the mount for holding the mount upright in a position to display its picture. Particularly when a picture frame or other mount is molded or die cut and delivered as a substantially finished product, it is desirable to avoid the additional expense of providing any special and separate means for attaching an easel, or for holding the glass and the picture in place within a frame. According to the present invention, an economically manufactured and separately fabricated easel is not only applied frictionally to any mount, but may itself constitute a means for holding a glass and picture in place. Even where the mount requires no glass or picture-retaining means, I may use features of the present invention to provide a separable easel member which is readily applicable and detachable. It is a further object of the invention to provide a form of detachable easel or support which may be packed flat with a mount for convenience of packaging and shipment.

It is a further object of the invention to provide a mount and easel assembly wherein the mount is elongated, and the easel is applicable either to a longer or shorter side of the mount.

In the drawings:

Fig. 7 is a rear view in perspective of a further modified embodiment of the invention.

Fig. 8 is a view of the device of Fig. 7 in central vertical section.

Fig. 9 is a view in perspective showing a further modified embodiment of the invention.

Fig. 10 shows the device of Fig. 9 in vertical central section.

Fig. 11 is a fragmentary detail view on an enlarged scale showing partly in section and partly in perspective two of the component parts of the assembly shown in Fig. 9.

Fig. 12 is a rear view in perspective of a further modified embodiment of the invention.

Fig. 13 is a fragmentary front view in perspective of the frame shown in Fig. 12.

Fig. 14 is a view in perspective showing a mount particularly adapted to serve as an advertising display card when equipped with an easel in accordance with this invention.

Fig. 15 is a view in perspective showing the device of Fig. 14 with the easel positioned thereon for shipment.

Fig. 16 is a view in side elevation of the device of Fig. 15.

Fig. 17 is a view in perspective showing a further modified embodiment in which the easel is applied to a mount which is fabricated separately from a frame and to which the frame is adhesively attached.

Fig. 18 is a view in perspective of the rear portion of the device shown in Fig. 17.

Fig. 19 is a view in vertical longitudinal section through the device of Figs. 17 and 18.

Figure 1:
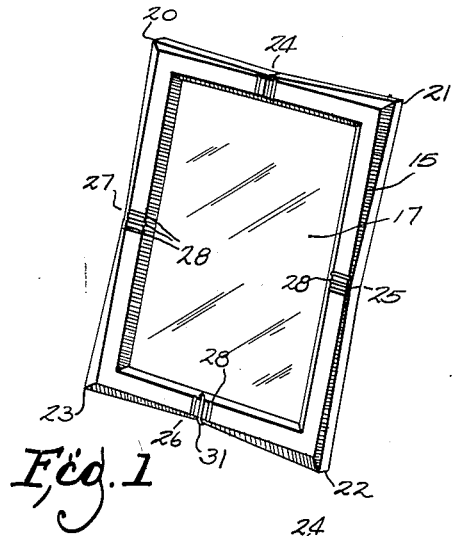
Fig. 1 is a front view in perspective of an easel-supported frame embodying my invention.
Figure 2:
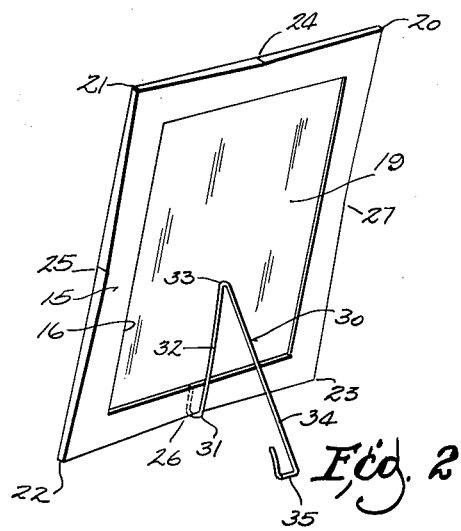
Fig. 2 is a rear view in perspective of the assembly shown in Fig. 1.

The frame 15 shown in Figs. 1 to 4 is preferably molded integrally of plastic. It is provided with the usual rearwardly opening rabbet 16 to receive the glass 17, the picture 18, and the backing sheet 19. In the integral molding of such a frame, it is difficult to provide any means which will satisfactorily hold the glass and picture firmly within the rabbet of the frame without going to additional expense to fabricate and attach clamping devices for this special purpose.

According to my invention, I provide the frame with an easel which not only supports, but also clamps the glass and the picture securely within the frame.

Figure 3:
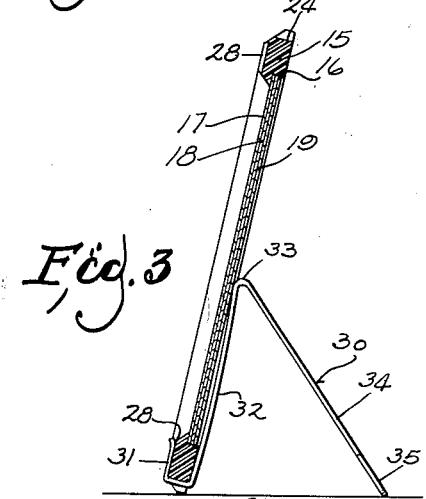
Fig. 3 is a view of the device of Fig. 1 in central vertical section.

In the present embodiment of the invention, the sides of the frame are widest at the corners 20, 21, 22 and 23 and are narrowest at the midpoints 24, 25, 26 and 27. This feature is not only ornamental, but it facilitates the application of a wire easel of the particular form hereinafter to be described. To receive the easel, while at the same time contributing to the ornamentation of the frame, the sides and ends of the frame are preferably provided with one or more grooves 28 at the points where the sides of the frame are most narrow. The easel 30 comprises a single piece of wire having in one end a hook 31 engaged about one side of the frame in one of the grooves, as best shown in Figs. 1 and 3. Only the short end of the hook 31 is exposed at the front of the frame. At the rear of the frame, a portion 32 of the wire extends upwardly and is preferably somewhat concavely bowed, as shown in Fig. 3, so that the apex 33, where the wire is bent rearwardly and downwardly, comprises a clamping portion of the easel which is held by hook 31 and by the resilience of the wire strand 32 in pressure engagement with the backing sheet 19, thereby to hold the picture and glass tightly in the frame.

Strand 34 of the wire extends downwardly from apex 33 and outwardly from the frame and terminates in a hook 35 which is in a plane at right angles to hook 31, but is likewise made to be resiliently engageable with one side of the frame.

For transportation purposes, the hook 31 is disengaged from the frame, thereby completely removing the easel. The hook portion 35 of the easel is then engaged with the frame, the longer leg 34 of the easel extending up the back, and the shorter leg 32 extending laterally with hook portion 31 in face contact with the side of the frame or the mouth therein.

Due to the inward concavity of the respective sides of the frame, the corners 22, 23 of the frame project beyond the wire so that the assembled frame and easel will remain stable with three points of contact on any supporting surface, the three points comprising, in the frame as illustrated, the corners 22 and 23 and the easel foot 35.

If the picture to be mounted in the frame should be elongated horizontally, rather than vertically, the hook 31 is engaged with the appropriate groove 28 at either long side of the frame, whereupon the three points of contact may be, for example, the corners 21 and 22 and the easel foot 35.

Figure 4:
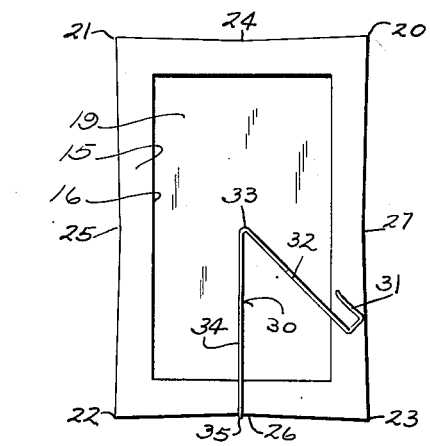
Fig. 4 is a rear view of a mount with the easel positioned thereon for shipment.

In both cases, the easel comprises a frame-engaging portion 31 which, being initially slightly narrower than the frame, must be resiliently expanded to engage the frame, and is frictionally held thereto. The easel also comprises a clamping portion 33 which holds the picture within the frame by reason of the frictional engagement of the frame-engaging portion 31 with the frame. The easel also includes a supporting foot 35, the preferred hooked formation of which not only avoids injury to the table or shelf upon which the frame is supported, but also enables the easel to be stored flat against the frame as shown in Fig. 4 for purposes of shipment.

Figure 5:
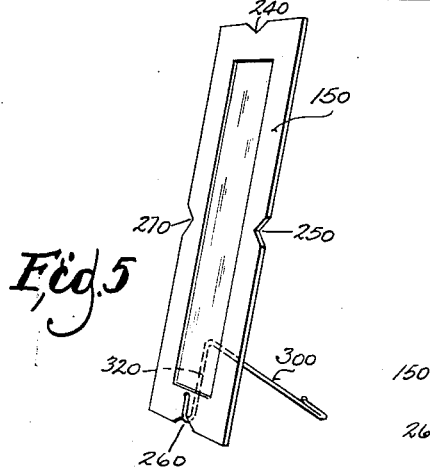
Fig. 5 is a view in perspective showing a modified frame and easel assembly embodying the invention.
Figure 6:
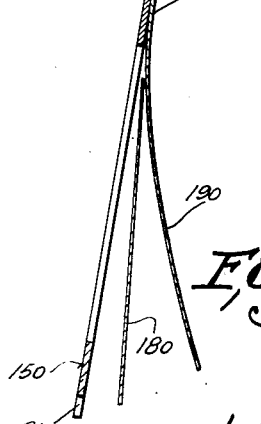
Fig. 6 is a view in longitudinal section through the frame of Fig. 5 with the easel removed.

Figs. 5 and 6 show a much cheaper form of frame such as may be cut from sheet material. The frame 150 has notches 240, 250, 260 and 270 intermediate its corners at its several sides. Its backing sheet 190 may be cemented to the frame at 191 and free of the frame elsewhere to receive the picture 180. The easel 300 is identical with that previously described except that its hooks are smaller to frictionally engage the flat stock of which the frame 150 is constructed. Also, the leg 320 of the hook 300 may be shorter in proportion than the leg 32 of easel 30. Various changes in design are possible, as is evidenced by this embodiment of the invention.

While it is desirable, from many standpoints, to make use of the ornamentation of the frame as a means of frictionally engaging the easel therewith, it is not necessary that the frame-engaging portion of the easel extend to the front face of the frame. In the construction shown in Figs. 7 and 8, the frame 151 has apertures 281 opening to its back face and disposed midway of its corners in at least one long side and one short side of the frame. Selectively engageable in one or another of these apertures is the frame-engaging portion 311 of the easel 301. The frame-engaging portion 311 comprises a lug of such dimensions that it may be forced with a pressed fit into the aperture 281. This easel is angularly formed and has a table-engaging apex at 351 and a terminal clamping portion 331 which, with the plug 311 fully engaged in aperture 281, is in clamping engagement with the backing sheet 19 to hold the picture 18 and glass 17 in the rabbet 16. The easel 301 may conveniently be made of plastic or metal, and the resilience with which it presses the picture and glass into the frame is attributable in part to its own resilience, and part to a relative yielding between the peg portion 311 and the aperture or socket 281 in the frame.

The frame may be made in the form shown at 152 in Fig. 12 and Fig. 13. Again this frame is desirably molded in one piece of plastic, and in order to provide integral lugs 37 behind which the picture 182 may be manipulated as shown in dotted lines in Fig. 12, notches 38 are formed in the frame opposite the lugs opening through the rabbet to the lugs to accommodate the die parts by which the lugs are formed. The presence of the lugs, which hold, but do not clamp, the picture, may make unnecessary the clamping function of the easels previously described, and accordingly I may use the easel 302 which has a frame-engaging portion 312 engaged in the appropriate frame aperture 282 to hold the easel in a frame-supporting position.

In the construction shown in Figs. 9 to 11, the frame 153 is provided at opposing sides with bevelled notches 283, together constituting a dove-tail or tenon with which the complementary tongues 39 of the elongated mortise 40 in the clamping portion 332 of the easel 322 are engageable. The easel 322 may comprise a piece of wooden dowelling or a band of plastic which may be sprung elastically to engage its tongues 39 over the bevelled and notched portions of the frame as shown in Fig. 10. The base 312 provides the table-engaging portion of this easel, and the resilience of the standard holds the picture within the frame, while the ends of the tenon 40 are frictionally engaged with the frame.

In the construction shown in Figs. 14 to 16, the mount 154 comprises a single sheet of material such as cardboard, glass, or plastic. The picture or message to be displayed may be printed in any manner directly on the face of mount 154, or it may be adhesively joined to the mount, or it may be held thereto by the hook 31 of the easel 30 for which the mount may be notched at 264. As in the previously disclosed embodiments of my invention, the hook 31 and the hook 35 have substantially the same dimensions and are interchangeably engageable with a selected margin of the mount so that, for packaging or transportation, the easel may have its hook 35 engaged with the mount as shown in Figs. 15 and 16, the rest of the easel thereupon being disposed in face contact with the mount or the picture 184 thereon.

In some of the frame constructions previously described, the frame itself may be regarded as the mount, but in the device of Figs. 17 to 19, the mount respectively comprises the backing sheet 195. The easel 30 is applied directly to the backing sheet and is completely covered by the frame 155 which is adhesively or otherwise connected with the backing sheet as shown in Fig. 19. As in previous constructions, the material to be displayed, whether a picture or advertising matter, may be printed directly upon the mount 195, or on a separate sheet interposed between the mount and the frame. In this construction, the frame has no rabbet to receive either a picture or glass, but is merely a card which may have molded edges if desired, and is provided with a central aperture for display purposes.

As in the other constructions here disclosed, the easel supports the mount in display position, but may be adjusted into face contact with the mount when its hook 35 is connected with the mount for shipment.

I claim:

1. The combination with an apertured mount, of an easel comprising means for holding said mount in display position, said easel comprising a single member having a mount-engaging portion frictionally engaged with the mount, a picture-clamping portion disposed intermediate the sides of the mount, a supporting portion offset from the mount, and easel parts connecting said portions, the frame-engaging portion of the easel comprising a peg frictionally fitted in said aperture.

2. The combination with a mount having a grooved side, of an easel comprising means for holding said mount in display position, said easel comprising a single member having a mount-engaging portion frictionally engaged with the mount, a picture-clamping portion disposed intermediate the sides of the mount, a supporting portion offset from the mount, and easel parts connecting said portions, the mount-engaging portion of the easel comprising a hook frictionally clamping said side and disposed in said groove.

3. As an article of manufacture, a picture frame having projecting corners for its support, and a frame side receding intermediate said corners and provided with a positioning groove for a frame-engaging clamp extending about said frame side between said corners.

4. The combination with a frame adapted to display a picture or the like, of an easel comprising a pair of brace portions angularly joined at an apex, one of said brace portions having a terminal peg for which said frame is provided with a socket, the peg being frictionally engaged therein, the other of said brace portions having a terminal clamping surface positioned to clamp a picture into the frame, the apex at which said brace portions are angularly joined constituting a table-engaging portion of said easel.

5. The combination with a standard having an elongated mortise terminating in oppositely directed hooks, of a frame having bevelled side members constituting an elongated tenon with which said hooks are releasably engaged.

6. The device of claim 5 in which the intermediate portion of said standard comprises a pressure applicator having a forward extent such as to contact and hold a picture within the frame when the frame sides are engaged with the hooks of the standard.

JOHN J. SEELMAN.

REFERENCES CITED

The following references are of record in the file of this patent:

UNITED STATES PATENTS

| Number | Name | Date |
| --- | --- | --- |
| 467,284 | Wirths | Jan. 19, 1892 |
| 844,901 | Smith | Feb. 19, 1907 |
| 1,081,048 | Klee | Dec. 9, 1913 |
| 1,450,821 | Schutz | Apr. 3, 1923 |
| 1,778,728 | Raskin | Oct. 21, 1930 |
| 2,272,479 | Prew | Feb. 10, 1942 |